United States Patent [19]

Mattmuller

[11] 4,113,459
[45] Sep. 12, 1978

[54] METHOD AND APPARATUS FOR MELTING MINERAL MATERIALS

[75] Inventor: Rene Mattmuller, Malakoff, France

[73] Assignee: Saint-Gobain Industries, Neuilly-sur-Seine, France

[21] Appl. No.: 767,441

[22] Filed: Feb. 10, 1977

Related U.S. Application Data

[63] Continuation-in-part of Ser. No. 602,670, Aug. 7, 1975, abandoned.

[30] Foreign Application Priority Data

Nov. 2, 1976 [FR] France .................... 76 03720
Aug. 14, 1974 [FR] France .................... 74 28188

[51] Int. Cl.² ................................. C03B 3/00
[52] U.S. Cl. ........................ 65/135; 65/136; 65/181; 65/335
[58] Field of Search ............ 65/27, 62, 135, 136, 65/181, 335, 337

[56] References Cited

U.S. PATENT DOCUMENTS

| 296,227 | 4/1884 | Schulze-Berge | 65/135 |
|---|---|---|---|
| 1,610,377 | 12/1926 | Hitner | 65/335 X |
| 1,807,054 | 5/1931 | Wadman | 432/13 |
| 2,578,110 | 12/1951 | Tooley | 65/136 |
| 2,593,197 | 4/1958 | Rough | 65/136 |
| 3,607,190 | 9/1971 | Penberthy | 65/134 |
| 3,880,639 | 4/1975 | Bodner et al. | 65/135 X |

FOREIGN PATENT DOCUMENTS

| 674,696 | 1/1966 | Belgium | 65/335 |
|---|---|---|---|
| 644,561 | 6/1928 | France. | |
| 2,242,338 | 3/1975 | France. | |
| 2,281,902 | 3/1976 | France. | |

Primary Examiner—Arthur D. Kellogg
Attorney, Agent, or Firm—Pennie & Edmonds

[57] ABSTRACT

A method and apparatus for melting mineral materials, particularly vitrifiable materials, for the manufacture of glass in which the materials to be melted are supplied in the form of finely divided solid elements with each element containing the totality of the components, in their proper proportions, necessary for the formation of the glass. These materials are deposited onto a thin molten layer of the same material formed on a hearth. The molten layer is fed along the hearth and heaters produce an intense heating of the materials to produce the melting thereof.

35 Claims, 4 Drawing Figures

METHOD AND APPARATUS FOR MELTING MINERAL MATERIALS

RELATED APPLICATION

This application is a continuation-in-part of applicant's copending application Ser. No. 602,670, filed Aug. 7, 1975, entitled "Method and Apparatus for the Manufacture of Glass", now abandoned.

BACKGROUND OF THE INVENTION

It is known, in cyclone type melting furnaces, how to cause finely divided vitrifiable raw materials to flow onto the strongly inclined or vertical walls of revolution. In such construction, the material is heated by jets of hot gases introduced tangentially to the walls. The raw material must be finely divided so that under the dynamic action of the gas jets, it is distributed homogeneously and flows with a slow enough speed to be able to melt during its travel. The drawback of these devices is a segregation of the raw materials deposited on the wall causing heterogeneities during melting.

In copending U.S. application Ser. No 602,670 filed Aug. 7, 1975, now abandoned, entitled "Method and Apparatus for the Manufacture of Glass", a rapid glass refining process is described in which a raw vitreous mass is brought to an elevated temperature while maintaining the viscosity of the molten mass at less than 1000 poises. Then, an intense foaming of this molten mass is effected throughout its entire thickness while keeping the viscosity at a value less than 1000 poises. The rate of expansion of the mass is at least about 1.5. After the end of the foaming, a perfectly refined glass is collected. The present invention relates to a prefusion process and devices that can advantageously be used in association with the process described in said copending application

SUMMARY OF THE INVENTION

The process according to the invention is characterized in that the vitrifiable material to be melted is in the form of an agglomerated mixture divided into solid elements, each element containing the totality of components in the proportions necessary for the formation of glass. These elements are preheated to a temperature below that of fritting and then placed on the surface of a thin layer of molten material of the same nature and subjected to an intense heating by hot gaseous currents directed toward the molten surface. The molten mass is fed along a path to the entrance of a glass refining apparatus as disclosed in the above-mentioned copending application. The movement of the molten mass also continually renews the receiving layer on which the raw material is deposited.

The apparatus for carrying out the process of the present invention includes a hearth opposite and above which are placed burners which direct the hot gases toward the hearth in a direction preferably close to perpendicular. Means are provided for depositing the mineral materials to be melted onto the hearth. The material is deposited in a finely divided form such as gravel, granules, balls, shot, small plates and the equivalent. Heat exchange means preheats the material to a temperature below the fritting point, before its arrival on the hearth. Finally, means are provided for removing the melted material from the hearth and directing it into the glass refining apparatus.

DETAILED DESCRIPTION OF THE PREFERRED EMBODIMENTS

In the present example, the raw materials are agglomerated from a homogeneous mixture comprising all the constituents of a common soda-lime glass so as to constitute small size solid elements such as gravel, granules, pellets, briquettes and small plates. Preferably, the size of the elements will be on the order of 5 to 30 mm. Processes for making such elements are known in themselves. Thus, granules can be obtained by extrusion with or without a binder. Briquettes can be made by standard devices such as briquetting machines.

Figure 1:
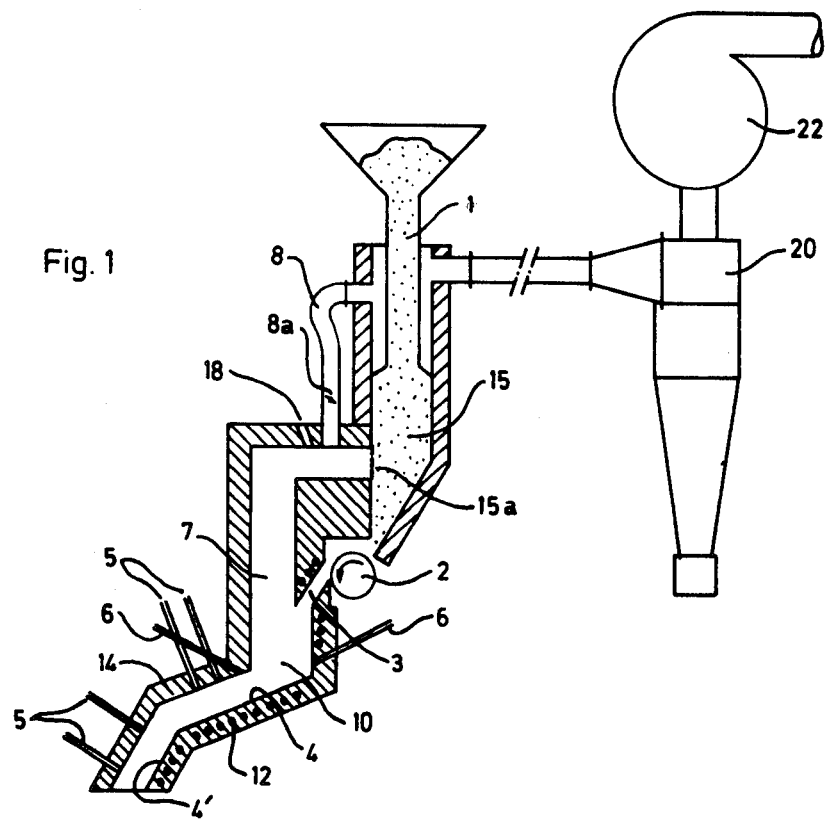
FIG. 1 is a schematic view, in longitudinal section, of the apparatus according to the invention for melting mineral materials.

With reference to FIG. 1, the raw material to be melted is placed in a hopper-heat exchange structure 1 which has an exit at its lower end disposed over a distributor drum 2 by which the basic elements of the raw material to be melted are guided through a conduit 3 above the end of hearth 4, of melting furnace 10. This hearth 4, which is constructed of refractory material, comprises an inclined part followed by a more steeply inclined overflow part 4'. This hearth is made up of blocks of refractories such as sillimanite. Steel pipes 12 extend through hearth 4 perpendicularly to the plane of symmetry of the installation. Cooling fluids with variable delivery are fed through these pipes 12 to regulate the temperature of the hearth. The arch 14 of the furnace is covered with insulating bricks.

Burners 5 are disposed above the hearth. These burners extend through the arch 14 and are directed preferably almost perpendicularly to the hearth. Additional burners 6 extend through the bottom of chimney 7 of the furnace and are directed so as to make their flame converge in the zone of arrival of the raw materials introduced into furnace 10 by conduit 3. Burners 5 and 6 are of the so-called "intensive" type, i.e., ones in which the rate of ejection of the gases is greater than the rate of combustion of the fuel mixture used and in which the flame is caught onto the combustion chamber created in the arch.

Above the hearth 4, the chimney 7 collects the combustion fumes which go through a grill 15a into a heat exchanger 15 in which the elements of the raw material to be melted travel by gravity in a direction countercurrent to the flow of the fumes.

The gases thermally depleted in exchanger 15 and those coming directly from chimney 7 through bypass 8 are sent into a dust-removal cyclone 20. Circulation of these gases and their evacuation are assured by a blower 22.

Exchanger 15 assures a preheating of the material to be melted to a temperature between about 500° C. and 600° C. at the level of distributor 2. The temperature of the combustion gases penetrating into exchanger 15 is on the order of 750° C. and is regulated by dilution with cold air admitted through the orifice 18. Bypass 8 is provided with an adjustable flap valve 8a making it possible to control the delivery of combustion gases through this bypass.

Figure 2:
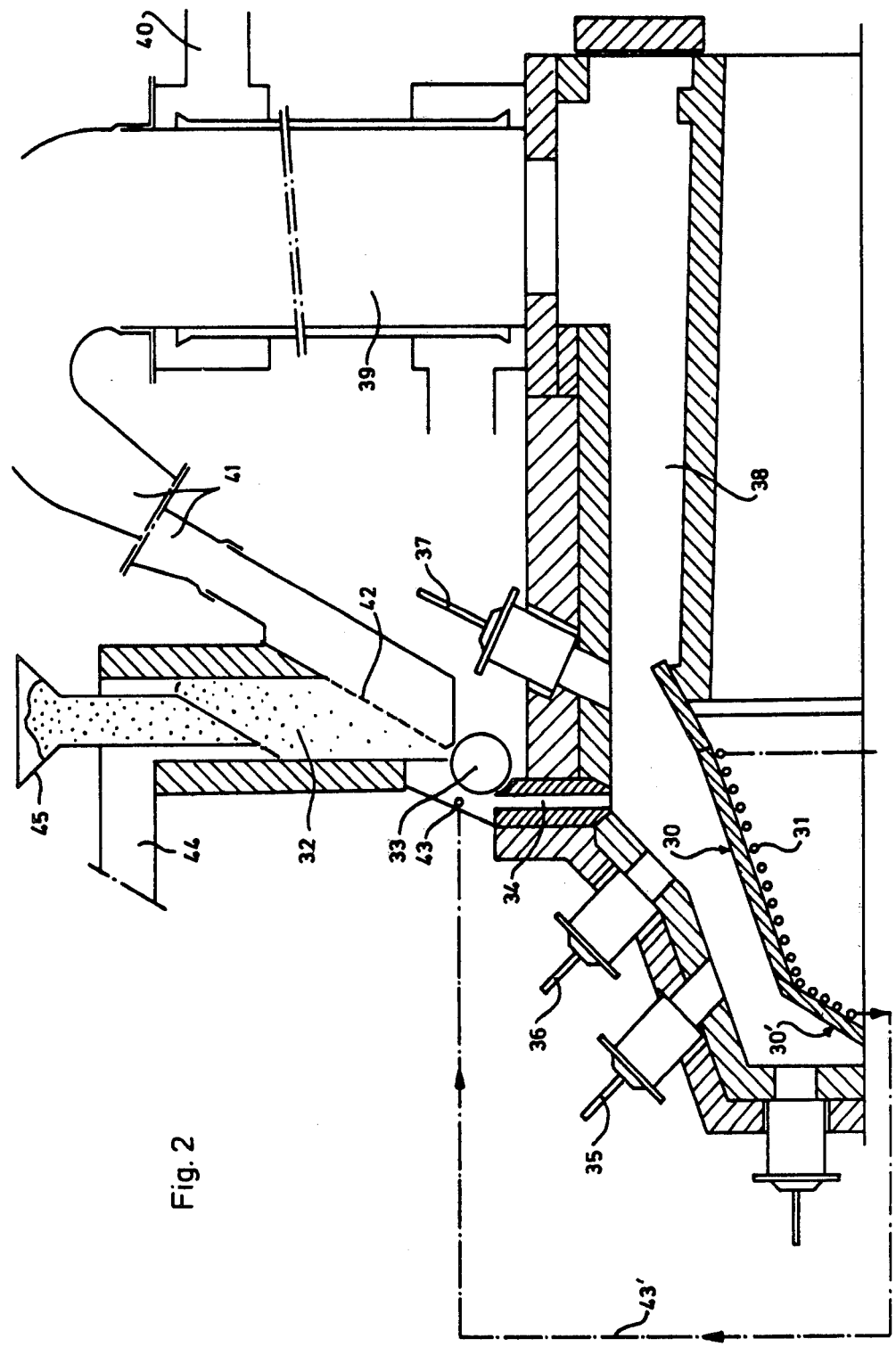
FIG. 2 represents, in longitudinal section, a modified embodiment of the apparatus shown in FIG. 1 including structure for the recovery of the heat of hot gases.

Reference is now made to FIG. 2 which represents a variant of the device of the invention. In this construction, the hearth 30 and spout 30' are cooled by a cooling fluid, for example, air, which is circulated through a circuit of pipes 31. By regulating the air delivery, it is possible to control with precision the temperature of the hearth. The raw materials brought from hopper 45 flow onto the hearth 30 by means of distributor drum 33 and conduit 34.

Burners 35 and 36 assure the melting of the raw materials. A burner 37 acts as the end of the hearth to prevent countercurrents and carrying of the material upstream. A conduit 38 assures evacuation of the fumes into a heat recovery device 39 where they are cooled during heating the air in pipe 40 which air serves to feed the burners and, optionally, the dryer of the installation described below with reference to FIG. 4. The fumes are then brought through a conduit 41 and a grill 42, into heat exchanger 32 where they heat the raw materials.

The air for cooling the hearth 30 which circulates in pipes 31 is directed, by a conduit 43', to a point above the intake conduit 34 of the material. This creates a dynamic counterpressure at 43 which is directed downwardly to prevent rising of hot gases. Such gases, if they came to the height of distributor drum 33, could deteriorate it and cause premature meltings of the raw materials and clogging.

The upper part of exchanger 32 includes a conduit 44 for evacuating the fumes which are then directed toward a scrubber cyclone, not shown, before being released into the atmosphere by means of a centrifugal blower. This part of the installation is identical with that described above with reference to FIG. 1.

The raw materials are introduced into exchanger 32 from a filling hopper 45 whose lower section is cut at a bevel to balance the losses of load in exchanger 32 and to avoid a greater delivery of hot gasses on one side of the exchanger in relation to the other. This characteristic facilitates the flow of products and the homogeneity of their temperature at the level of the distribution drum.

Figure 3:
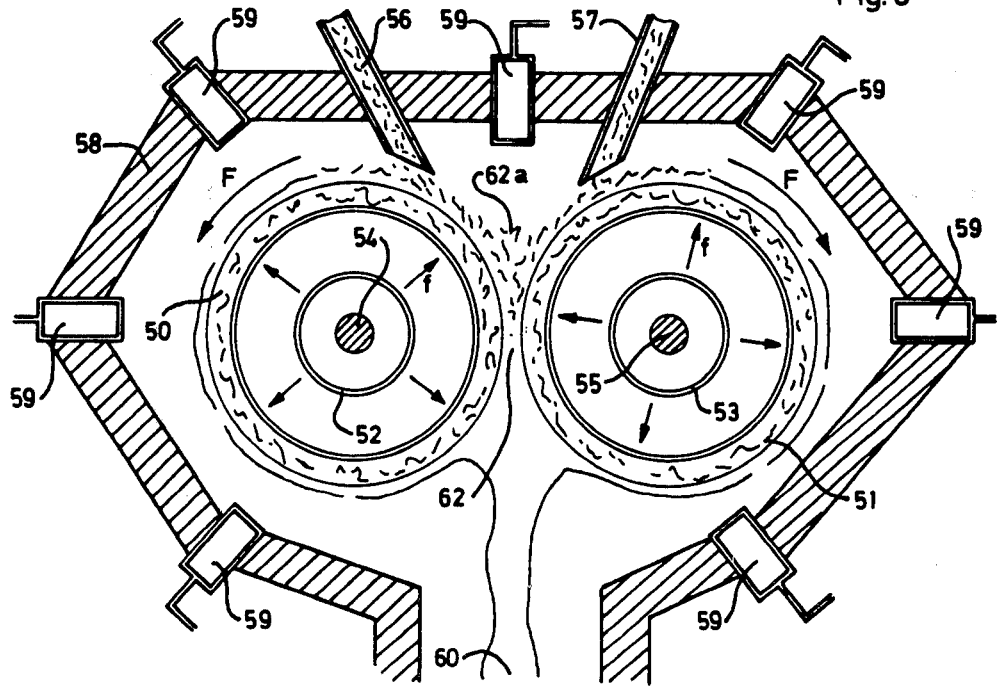
FIG. 3 represents, in vertical section, still another embodiment comprising a drum-shaped hearth.

In the embodiment shown in FIG. 3, the melting hearth is defined by the peripheral walls of two hollow drums 50 and 51. These walls are constructed of refractory materials such as, for example, concrete of refractory cement and corundum. They are monolithic or an assembly of molded pieces. These drums are driven in rotation in the direction of arrows F by a motor not shown. Cold air pipes 52 and 53, extending concentrically to shafts 54 and 55 of the drums, make it possible to direct an air current f against the inside walls of the periphery of the drums to keep them at the desired temperature which is on the order of 900° C.. The outside surfaces of the drums define between them a space 62, of some centimeters, sufficient to accommodate the molten layer. The raw material to be melted is delivered to the drums by conduits 56 and 57 and slides to the point 62a above the space 62.

A housing 58 surrounds the drums in spaced relation thereto. The housing carries burners 59 directed approximately along the radii of the drums to apply jets of hot gases on their periphery. Additional burners can be provided between the drums and the housing, at each end of the drums, to direct the charge of melting material toward the median part of the drums. These additional burners are aligned with the burner 59 which overlies the space 62. Thus, cloggings due to an incomplete melting of the raw material are avoided; and the molten material flows at 60 into the refining furnace, not shown. Because of its nature, the melting technique according to the process of the invention should preferably employ a compact mixture, which is, for example, in the form of pellets or small plates and which lends itself to preheating of the charge in a column through which hot fumes pass.

Figure 4:
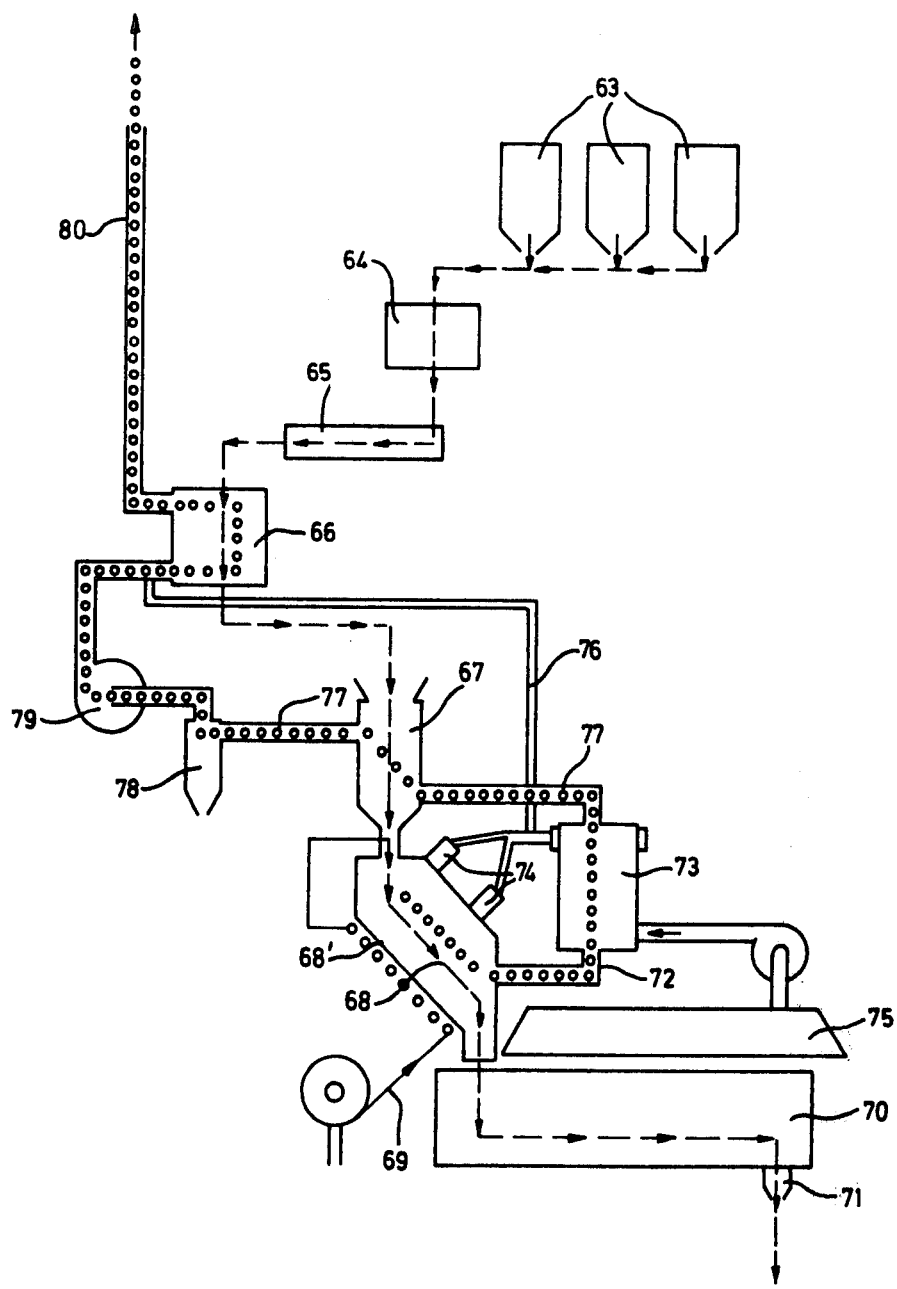
FIG. 4 is a schematic overall view of an installation according to the invention with the heat recovery circuit.

Reference is now made to FIG. 4 which schematically represents an installation according to the invention. The raw materials stored in hoppers 63 are weighed, mixed in mixer 64, compacted in a compacting installation 65 and finally dried in a dryer 66. As described above, these raw materials are introduced into a preheating heat exchanger 67 from which they are brought into a melting unit 68 comprised of a hearth 68' cooled by circulation of a cooling fluid 69. The mixture of raw materials, preheated in the heat exchanger 67 to temperatures on the order of 500° C. to 600° C., is brought into unit 68 at its melting temperature. The temperature of the hearth is about 900° C. so that the under layer of the molten material is fixed at tis contact, it means it is practically immobilized. The upper surface of this material, for example glass paste at 1300° C., flows by gravity to the refining furnace 70 of the type described in the above-mentioned copending application. The glass exits from the furnace through a drawing off orifice 71.

The circuit of the fumes from the burners will now be described. The fumes are evacuated from the melting unit 68 via a conduit 72 at a temperature on the order of 1350° C.. They are then delivered to a heat recovery device 73 (identical with heat recovery device 39 of FIG. 2) where they are used to heat the air being supplied to the burners 74. This combustion air is collected by hood 75 disposed above the furnace 70. Consequently, this air is charged with sulfur dioxide emitted by the refining reactions, which makes it possible to oppose the premature decomposition of the sulfates at the level of the premelting. The air is directed into the heat recovery device 73 and then to the burners 74. A bypass 76 allosw a part of the hot air coming from the heat recovery device to be shunted directly to the dryer 66.

The fumes coming out from heat recovery device 73 at about 700° C. are directed by a conduit 77 through the column of materials in the heat exchanger 67 where they are used to bring the temperature of the materials to values on the order of 500° C. to 600° C.. These fumes, after passing through the heat exchanger are on the order of 300° C. and are thereafter aspirated through a conduit 77a, by a blower 79, to direct them to a scrubber cyclone 78. From the cyclone, they are finally delivered to the dryer 66 before their evacuation through chimney 80.

Of course, many other materials can be melted or elaborated by modifying for instance, the slope of the hearth or the working temperatures without departing from the scope of the invention.

I claim:

1. The method of obtaining a molten vitreous mass comprising the steps of:
    (a) supplying the raw material to be melted in the form of solid granular elements with each element containing essentially the components in the proportions necessary for the formation of said molten mass;
(b) preheating the elements to a temperature below the fritting temperature at which the raw material becomes tacky;
(c) depositing the elements onto a molten surface of a thin receiving layer previously formed from the raw material;
(d) subjecting the raw material which is deposited onto the molten surface to an intense heating by hot gaseous currents to effect melting of the raw material;
(e) moving a portion of the resulting molten mass along a path extending away from the location of deposit of the raw material to leave a receiving layer with a molten surface; and
(f) recovering the vitreous molten mass.

2. A method according to claim 1, in which the lower surface of said receiving layer is refrigerated at a temperature below the fritting temperature of the material.

3. A method according to claim 2, in which hot gaseous melting currents are directed to the upper surface of said receiving layer in the zone where the elements are deposited onto that layer.

4. A method according to claim 3, in which the raw material is supplied at a continuous rate.

5. The method according to claim 2 wherein:
(a) the raw material is supplied in the form of granular elements of briquettes shot, plates or gravel of a size between about 5 and 30 mm.

6. The method according to claim 1 wherein:
(a) the molten mass is moved continuously along said path;
(b) the thin receiving layer of molten material is formed by melting of the raw material first deposited onto the path at said locations; and
(c) the rate of movement of molten mass along said path and away from said location is at a speed sufficient to continuously maintain a thin layer of the molten material at said location after initial formation of said layer.

7. The method of obtaining a molten vitreous mass comprising the steps of:
(a) supplying the raw material to be melted in the form of solid granular elements with each element containing essentially the totality of components in the proportions necessary for the formation of said molten mass;
(b) preheating the elements to a temperature near but below the fritting temperature;
(c) depositing the elements onto the molten surface of a thin receiving layer issued from the raw material;
(d) subjecting the raw material which is deposited onto the molten surface to an intense heating by hot gaseous currents to effect an immediate melting of the raw material at the area of contact with the molten surface; and
(e) moving a portion of the resulting molten mass along a path extending away from the location of deposit of the raw material to continuously renew the molten surface and reform the receiving layer by the melting of the last deposited material.

8. Apparatus for obtaining a molten vitreous mass comprising:
(a) a hearth;
(b) heating means for heating the hearth;
(c) supply means for supplying the raw material to be melted to a location overlying the hearth, the raw material being in the form of solid granular elements with each element essentially containing the totality of components in the proportions necessary for the formation of the mass;
(d) preheating means for preheating the raw material at said location to a temperature below its fritting point;
(e) means for depositing the raw material onto the hearth;
(f) heating means for directing hot gases toward the hearth and onto said raw material in a direction approximately perpendicular thereto for effecting a rapid and homogeneous melting of the raw material to a molten mass at the location of deposit of said raw material; and
(g) means for moving a portion of the resulting molten mass along said hearth in a direction away from the location of deposit of the raw material and to a point of discharge from the apparatus and at a speed sufficient to continuously maintain a thin layer of the molten mass at said location after initial formation of said layer.

9. Apparatus according to claim 8 wherein:
(a) cooling means are provided in the hearth for cooling thereof.

10. Apparatus according to claim 9 wherein:
(a) the hearth is constructed of a slightly inclined refractory plane surface.

11. Apparatus according to claim 10 wherein:
(a) the hearth includes an overflow exit section at the lower end of the inclined hearth, said overflow exit section having a slope greater than that of the hearth.

12. Apparatus according to claim 11 wherein:
(a) the heating means includes conduit means for directing hot gases in a converging direction at the location of deposit of the raw materials onto the hearth.

13. Apparatus according to claim 12 wherein:
(a) the heating means are burners of the high speed flame type.

14. Apparatus according to claim 8 wherein the preheating means for preheating the raw material includes:
(a) heat recovery means for recovering the hot gases above the molten material on the hearth;
(b) regulator means for bringing these gases to a temperature less than the fritting temperature; and
(c) conduit means for introducing these gases into the raw materials to be melted.

15. Apparatus according to claim 14 wherein the regulator means includes:
(a) a cold air intake leading into said conduit for mixing cold air with gases therein.

16. Apparatus according to claim 14 wherein the regulator means includes:
(a) a second conduit means through which said heat recovery means extends, said second conduit means providing a passage for cold air.

17. Apparatus according to claim 8 wherein the supply means includes:
(a) a filling hopper;
(b) a heat exchanger located at the outlet of the hopper through which the raw material is fed in one direction to the outlet end thereof overlying the hearth and through which heating gases are fed in the opposite direction.

18. Apparatus according to claim 17 wherein:
(a) the outlet end of the filling hopper is cut on a bevel and disposed in the heat exchanger with the bevel facing the incoming gases.

19. Apparatus according to claim 16 wherein:
(a) the second conduit is connected to said burners.

20. Apparatus according to claim 8 further including:
(a) means for creating a dynamic counterpressure above the location of deposit of the raw materials onto the hearth to preclude rising of the hot gases from the hearth and toward the outlet end of the heat exchanger.

21. Apparaus according to claim 8 wherein:
(a) the hearth is comprised of one or more cooled rotary drums of refractory material.

22. Apparatus according to claim 8 wherein:
(a) the raw material supply means is located above the drums and includes a material feeding conduit disposed over each drum for directing raw material onto the top of each drum adjacent the space that separates them.

23. Apparatus according to claim 22 further including:
(a) drive means for driving the drums in opposite directions with the surfaces thereof adjacent the space between the drums having an upward component of movement opposite the path of movement of the raw material through the passage defined by said space.

24. Apparatus according to claim 23 wherein:
(a) the heating means directs hot gases at the peripheral surfaces of the drums to effect melting of the raw material at the location of deposit on the drum; and
(b) the speed of rotation of the drums is such that the adhering material is melted before arriving in the space between the drums at a rate to continuously maintain a thin layer of the molten material at the location of deposit of the raw material after initial formation of said layer.

25. Apparatus according to claim 22 further including:
(a) a refractory housing surrounding the drums in spaced relation thereto; and
(b) openings in the housing for mounting said heating means.

26. Apparatus according to claim 25 wherein:
(a) the heating means are hot gas burners and are positioned so as to direct hot gases approximately radially of the drums.

27. Apparatus according to claim 26 wherein:
(a) some of the burners are placed between the drums at each end thereof to bring the material being melted toward the median part of the drums.

28. Apparatus according to claim 8 further including:
(a) a glass refining device located at the point of discharge of the apparatus for receiving the molten mass coming from the apparatus.

29. Apparatus according to claim 28 wherein the preheating means comprises:
(a) means for collecting the hot gases above the hearth refining device;
(b) heat recovery means including regulator means for bringing the gases to a temperature less than the fritting temperature;
(c) conduit means for directing the hot gases, after their passage through the heat recovery means, through the supply of raw material for preheating the materials to be melted;
(d) second conduit means for supplying air to said heating means, said heat recovery means extending through said second conduit to effect heating of the air therein by the gases in the heat recovery means; and
(e) a scrubber device for cleaning the hot gases after passage through said raw material.

30. The method of claim 1 for use in the formation of sulfates glass, further comprising the steps of:
fining the vitreous mass by elevating its temperature,
recovering the air containing sulfur dioxide from the fining,
heating said air into gases at a temperature at least equal to the fritting temperature for heating the raw material.

31. The method of claim 30 in which said gases are used for melting said raw material.

32. Apparatus for obtaining a molten vitreous mass comprising:
(a) a hearth comprised of two closely spaced drums disposed in parallel relation and turning in opposite directions, the space therebetween being sufficient to accommodate a layer of molten mass;
(b) heating means for heating the hearth;
(c) supply means for supplying the raw material to be melted to a location overlying the hearth, the raw material being in the form of solid granular elements with each element essentially containing the totality of components in the proportions necessary for the formation of the mass;
(d) preheating means for preheating the raw material at said location to a temperature below its fritting point;
(e) means for depositing the raw material onto the hearth;
(f) heating means for directing hot gases toward the hearth in a direction approximately perpendicular thereto for effecting a rapid and homogeneous melting of the raw material; and
(g) means for moving the resulting molten mass along said hearth in a direction away from the location of deposit of the raw material, through said space between the drums and to a point of discharge from the apparatus.

33. A method according to claim 7 further comprising the steps of:
(a) supporting the receiving layer on an inclined hearth; and
(b) refrigerating the lower surface of the receiving layer to a temperature below the fritting temperature to substantially immobilize it on the hearth.

34. A method according to claim 33 wherein:
(a) the step of moving the molten mass is effected by gravity acting on the molten surface of the receiving layer on the inclined hearth.

35. Apparatus for obtaining a molten vitreous mass comprising:
(a) a hearth;
(b) heating means for heating the hearth;
(c) supply means for supplying the raw material to be melted to a location overlying the hearth, the raw material being in the form of solid granular elements with each element essentially containing the totality of components in the proportions necessary for the formation of the mass;

(d) preheating means for preheating the raw material at said location to a temperature below its fritting point;
(e) means for depositing the raw material onto the hearth;
(f) heating means for directing hot gases toward the hearth and onto said raw material in a direction approximately perpendicular thereto for effecting rapid and homogeneous melting of the upper surface of the raw material to a molten mass at the location of deposit thereof;
(g) cooling means in the hearth for cooling the lower surface of the raw material deposited on the hearth to a temperature below the fritting temperature to substantially immobilize it on the hearth; and
(h) means for orienting the hearth at an incline sufficient to effect movement of the resulting molten means along the hearth in a direction away from the location of deposit of the raw material and at a speed to continuously maintain the upper surface of the raw material as a molten mass at the location of deposit of said raw material.

* * * * *

UNITED STATES PATENT AND TRADEMARK OFFICE
CERTIFICATE OF CORRECTION

PATENT NO. : 4,113,459
DATED : September 12, 1978
INVENTOR(S) : Rene Mattmuller

It is certified that error appears in the above-identified patent and that said Letters Patent are hereby corrected as shown below:

In the Claims

Column 7, line 16, "claim 8" should read --claim 32--.
Column 8, line 11, "sulfates" should read --sulfate--.
Column 10, line 7, "means along" should read --mass along--.

Signed and Sealed this

Sixth Day of March 1979

[SEAL]

Attest:

RUTH C. MASON
Attesting Officer

DONALD W. BANNER
Commissioner of Patents and Trademarks